July 20, 1937. R. F. ANDERSON 2,087,495
WINDSHIELD
Original Filed Nov. 15, 1933
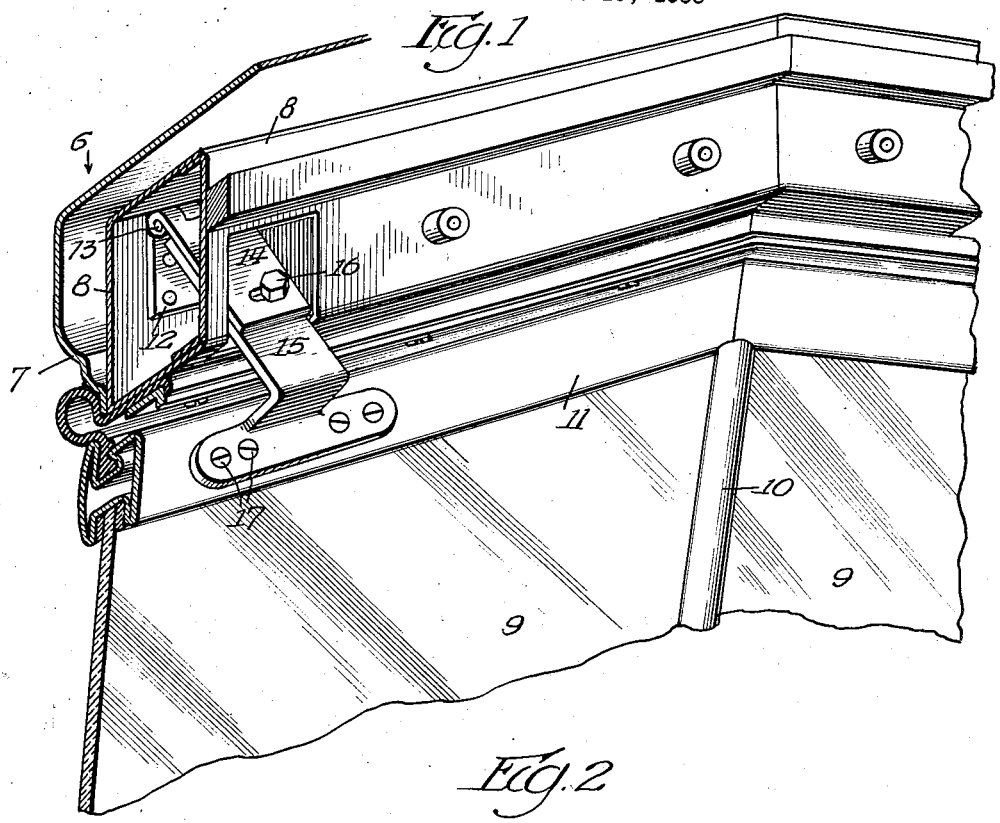
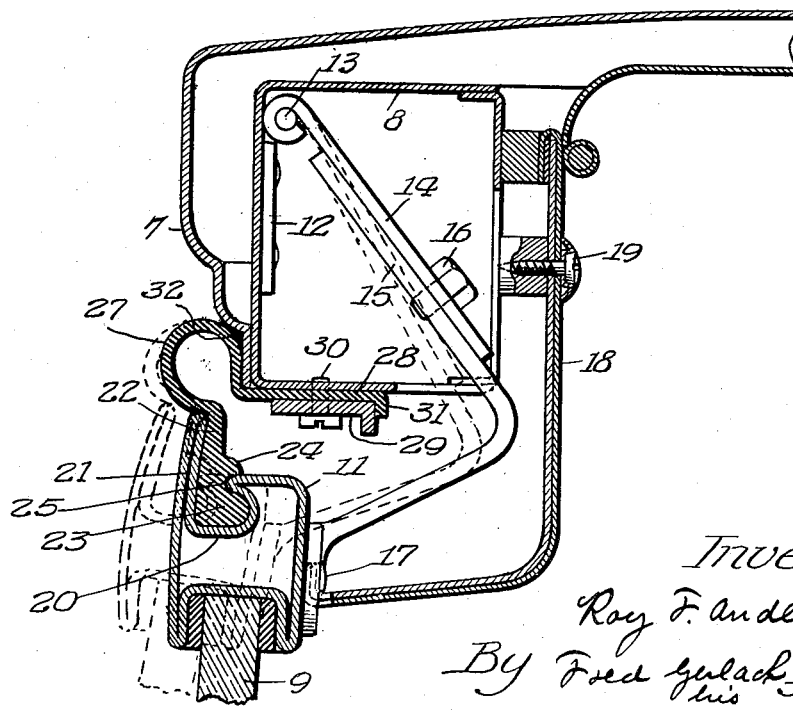
Inventor
Roy F. Anderson
By Fred Gerlach Atty.

Patented July 20, 1937

2,087,495

UNITED STATES PATENT OFFICE 2,087,495

WINDSHIELD

Roy F. Anderson, Auburn, Ind., assignor, by mesne assignments, to Auburn Automobile Company, Connersville, Ind., a corporation of Indiana Application November 15, 1933, Serial No. 698,049
Renewed January 2, 1937

3 Claims. (Cl. 296—84)

The invention relates to windshields and more particularly to the means for providing a weather or waterproof joint between the pivoted end of the shield and the body.

Heretofore it has been common practice to employ an elastic strip to bridge the gap between the body and the pivoted end of the shield, usually the top, when the shield is open. This strip was connected to either the shield or the body only and merely lapped the joint. Such a strip was not effective in preventing rain or water from leaking into the car at all times.

One object of the invention is to provide an elastic connecting strip for this purpose which is securely connected to both the body and the shield and provided with an intermediate bellows or curved portion which permits the shield to swing pivotally on its hinges while maintaining at all times an effective closure against the entry of wind, rain or water.

Another object of the invention is to provide an improved weather-proof strip which is adapted for use and effective with a windshield composed of rearwardly divergent members or plates, commonly known as a V-shield.

Other objects of the invention will appear from the description.

The invention consists in the several novel features hereinafter set forth and more particularly defined by claims at the conclusion.

In the drawing, Fig. 1 is a sectional perspective of a portion of an automobile body and windshield embodying the invention. Fig. 2 is a vertical section through the upper end of the windshield and the portion of the vehicle body to which it is connected.

The invention is exemplified as applied to a vehicle body 6 which comprises a header panel 7, and a hollow corner bar 8 fixedly secured to the upper corner of the body and a windshield comprising glass plates 9 which diverge rearwardly from a central post 10. The upper margin of the shield is set in a suitable upper rail or bar 11, which is provided with a downwardly facing groove in which the plates 9 are set, as well understood in the art. The windshield is suspended from or pivotally hung at its upper end, on the vehicle body so it can be swung angularly forward so it will diverge downwardly and forwardly from the vehicle body, to provide a space between the lower end of the shield and the car body, for ventilating the body. The windshield is suspended by a set of hinges in desired number, only one of which is illustrated. Each of said hinges comprises a member 12 which is fixed to the inner front corner of the bar 8, a hinge-pin 13, and a member pivotally connected to the pin and comprising sections 14 and 15 which are removably secured together by a screw 16. The lower hinge section 15 is removably secured by screws 17 to the back face of the top-rail 11 of the windshield. A cloth covered angular panel 18 is removably secured by screws 19 to the back of the hollow bar 8 to conceal the hinges and the joint between the windshield and the body. The hinges are transversely alined so the windshield will swing on an axis which is transverse to the body.

The top rail 11 extends continuously across the top margin of the windshield and is usually formed of a hollow metal strip. An undercut groove 20 is formed in the wall of the rail in back of the front wall 21 and extends continuously from end to end of the shield. A molded strip of rubber extends transversely across the width of the windshield to close the gap between the shield and the vehicle body. This strip of rubber comprises a lower marginal portion 22 with an enlarged backwardly projecting bead 23 which is adapted to be compressed and to fit snugly in the undercut groove 20 to form a firm interlock and tight joint between the lower margin of the strip and the top rail 11 of the windshield. The elastic strip also has a bead 24 which overlies the top wall of rail 12 to form a groove 25 into which the forwardly extending portion of the top wall fits so as to form an effective seal over the rail 11. The front wall of the rail 11 is extended upwardly beyond the groove 20 in which the bead 23 is confined to provide a wall against which the elastic strip seats. The elastic strip has a portion 28 to underlie the bottom face of the hollow bar 8. An angular metallic strip 29, which fits against the underside of the portion 28 of the elastic strip, is secured by a series of screws 30 to the bar 8 to clamp firmly the adjacent margin of the strip to the body of the vehicle. The strip has a down turned rib 31 fitting against the rear flange of the retaining strip 29. A curved or bellows portion 27 of the elastic strip is provided between the marginal portion 28, and the marginal portion which is secured in rail 11, to form a flexible continuous closure or seal between the shield and the body which permits the shield to be pivotally shifted. A filling 32 of adhesive or rubber cement is placed between the bellows portion 27 of the elastic strip and the header-panel to effectively prevent any moisture or water from leaking into the body over the portion 28 of the strip.

In use, the windshield is usually locked by any suitable mechanism (not shown) in its closed position. When it is desired to open the windshield to ventilate the car, the shield is swung forwardly on its hinges and the bellows portion 27 permits the upper margin of the shield to swing around the hinge-pin 13 as a center and while the shield is open forms an effective weather and water-proof closure between the body and the pivoted margin of the shield. The bellows is effective in closing the non-rectilinear gap which results from swinging the V-shaped windshield relatively to the body.

In installing the shield, the beaded lower edge 23 is forced into the undercut groove 20 in the top rail of the shield. The shield is then installed by connecting the hinge sections 15 to the hinge sections 14, with the portion 28 of the elastic strip under the bar 8. The retaining strip 29 is then secured in place by screws 30 to clamp said portion of the strip to the underside of the bar 8. The bellows portion 27 of the flexible strip will then be pressed forwardly and the filling of rubber cement placed between it and the header-panel 8. If it should be desired to replace the elastic strip, this can be readily done by removing the retaining strip 29, separating the portion 28 of the elastic strip from the header-panel and detaching the hinge sections 15 so that the shield will be accessible for the placement of a new flexible strip in the top rail thereof.

The invention exemplifies a windshield in which the joint between the pivoted end of the shield and the body is kept effectively and always closed to prevent the entry of wind, water or moisture at the joint. Also one which can be readily installed and replaced.

While the invention has been illustrated with a V-type shield, it will be understood that it is applicable to other types.

The invention is not to be understood as restricted to the details set forth since these may be modified within the scope of the appended claims without departing from the spirit and scope of the invention.

Having thus described the invention, what I claim as new and desire to secure by Letters Patent, is:

1. The combination with a vehicle body having a substantially vertical head panel and a substantially horizontal bar-like part fixedly secured in place behind the panel, a windshield having a rail along its upper edge positioned under and in spaced relation with respect to the head panel and embodying an upwardly facing, undercut groove, and hinges behind said panel and between the body and the shield for pivotally sustaining the shield and permitting it to be swung open, of a one piece, elastic strip extending continuously along the contiguous portions of the rail and head panel and having one of its marginal portions shaped to form an enlarged bead which fits within and corresponds in shape to the groove and serves to secure the strip to the rail, and its other marginal portion extending inwardly under the head panel and secured against the bottom face of said bar-like part, and having the intermediate or central portion thereof bulged outwardly into substantially three quarters round form to provide between said marginal portions a connecting bellows which extends upwardly and outwardly from the rail and then inwardly and downwardly in lapped relation with the front face of the head panel and serves to permit the shield to swing relatively to the body and to form a continuous weather-proof closure across the gap between the rail and the head panel.

2. The combination with a vehicle body comprising a substantially vertical head panel and a corner bar behind the panel having a substantially horizontal bottom face, a windshield having a rail along its upper edge positioned under and in spaced relation with respect to the head panel and embodying an upwardly facing, undercut groove, and hinges behind the head panel and between the bar and the rail for pivotally sustaining the shield and permitting it to be swung open, of a one piece, elastic strip extending continuously along the contiguous portions of the rail and head panel and having one of its marginal portions shaped to form an enlarged bead which fits within and corresponds in shape to the groove in the rail and serves to secure the strip to said rail, and its other marginal portion extending inwardly and fitting against the bottom face of the bar, and having the intermediate or central portion thereof bulged outwardly into substantially three quarters round form to provide between said marginal portions a connecting bellows which extends upwardly from the rail and laps the front face of the head panel and serves to permit the shield to swing relatively to the body and to form a continuous weather-proof closure across the gap between the rail and head panel, and a removable retaining strip independent of the hinges and fitting under said other marginal portion of the strip for securing the latter in place against the under face of the bar.

3. The combination with a vehicle body having a substantially vertical head panel and a horizontal bar-like part behind the panel, a windshield having a rail along its upper edge positioned under and in spaced relation with respect to the head panel, and hinges behind said panel and between the body and shield for pivotally sustaining the shield and permitting it to be swung open, of a one piece elastic strip extending continuously along the contiguous portions of the rail and head panel and having one of its marginal portions secured directly to the top portion of the rail and its other marginal portion extending inwardly under the head panel and secured against the bottom face of said bar-like part, and having the intermediate or central portion thereof bulged outwardly into substantially three quarters round form to provide between said marginal portion a connecting bellows which extends upwardly and outwardly from the rail and then inwardly and downwardly in lapped relation with the front face of the head panel and serves to permit the shield to swing relatively to the body and to form a continuous weather proof closure across the gap between the rail and the head panel.

ROY F. ANDERSON.